Figure 1:
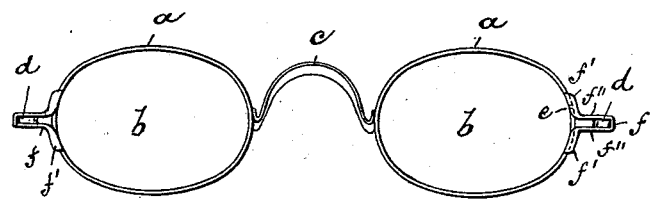

(No Model.)　　　　　　G. W. MEIGS.　　　2 Sheets—Sheet 1.
EYEGLASSES OR SPECTACLES.
No. 581,359.　　　　　　　　Patented Apr. 27, 1897.

Witnesses　　　　　　　　　　　　Inventor:
Robert Sollberger　　　George W. Meigs,
Beatrice Charles　　　　　By D Drake & Co, Atty's

THE NORRIS PETERS CO., PHOTO-LITHO., WASHINGTON, D. C.

(No Model.) 2 Sheets—Sheet 2.

G. W. MEIGS.
EYEGLASSES OR SPECTACLES.

No. 581,359. Patented Apr. 27, 1897.

Witnesses: Robert Sollberger, Beatrice Charles

Inventor: George W. Meigs,
By Drake & Co. Atty's.

THE NORRIS PETERS CO., PHOTO-LITHO., WASHINGTON, D. C.

UNITED STATES PATENT OFFICE.

GEORGE W. MEIGS, OF NEWARK, NEW JERSEY.

EYEGLASSES OR SPECTACLES.

SPECIFICATION forming part of Letters Patent No. 581,359, dated April 27, 1897.

Application filed July 31, 1895. Serial No. 557,656. (No model.)

*To all whom it may concern:*

Be it known that I, GEORGE W. MEIGS, a citizen of the United States, residing at Newark, in the county of Essex and State of New Jersey, have invented certain new and useful Improvements in Eyeglasses or Spectacles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly, although not exclusively, to that class of eyeglasses and spectacles in which the eye-wires are cut or open and the receptacles for the glasses or lenses thus rendered expansible to admit of said lenses being quickly inserted or removed, the ends of the eye-wires at the cuts or openings being held by elastic bows, the ends of which are secured to the eye-wires on opposite sides of the cut or opening, the bows crossing the cuts or openings at a distance therefrom and the limbs of said bows serving to give the elasticity by which the eye-wires are held to the edges of the lenses. In this class of devices of earlier construction having the elastic and expansible lens-receptacles, as described, the eye-wires provided have been defective in that when the lens was inserted in its receptacle and the latter expanded the edge of the lens could be seen through the opening in the wire due to expansion, thus giving to the said eye-wire an unfinished appearance, and because of the opening as arranged the receptacle was insecure and weak, and consequently a heavy and stiff frame was necessarily employed.

The object of this invention is to provide expansible lens-receptacles of greater strength and durability, to render the spectacles or eyeglasses more sightly, to cheapen construction by economizing material and using a less number of pieces, and to secure other advantages and results, some of which will be referred to hereinafter in connection with the description of the working parts.

The invention consists in the improved eyeglasses or spectacles and in the combinations and arrangements of parts, all substantially as will be hereinafter set forth and finally embraced in the clauses of the claim.

Figure 2:
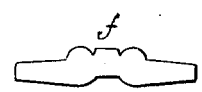
Figures 3, 4:
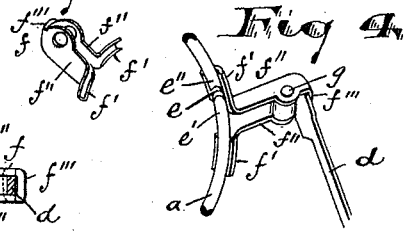
Figure 5:
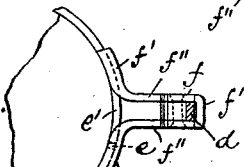
Figures 6, 7:
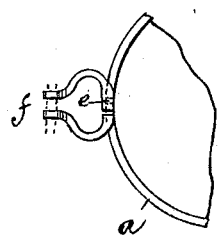
Figure 8:
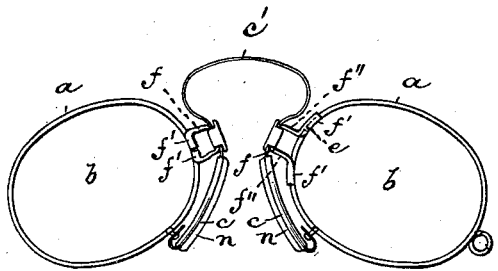
Figure 9:
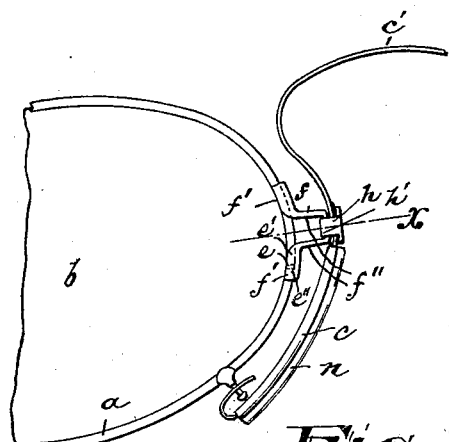
Figure 11:
Figure 12:
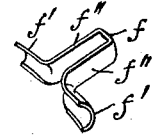
Figure 10:
Figure 13:
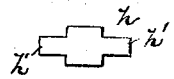
Figure 14:
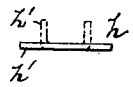
Figure 15:
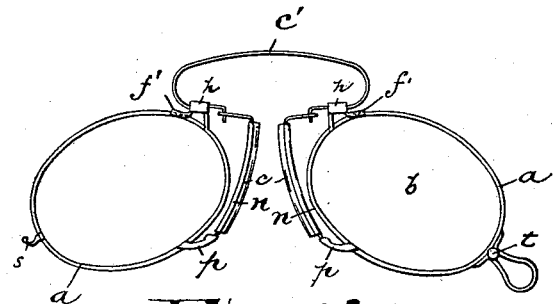
Figure 16:
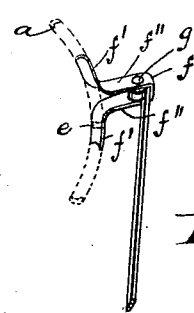
Figure 17:
Figures 18, 19:
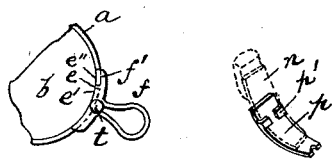

Referring to the accompanying drawings, in which like letters indicate corresponding parts in each of the several views, Figure 1 is a front view of a pair of spectacles having my features of improvement in the preferred form, the ear-wires or temples being omitted. Fig. 2 is a detail blank in plan of a certain bow for arching the cut or opening of the eye-wire and holding the opposite ends in proper relative position when said bow is employed with the ear-wire or temple. Fig. 3 is a detail perspective of the bow shaped to be attached to the eye-wire and receive said temple or ear-wire. Fig. 4 is a detail perspective showing the bow attached to said eye-wire and the temple or ear-wire pivoted within the bow. Fig. 5 shows the parts last referred to in elevation and section. Figs. 6 and 7 are details illustrating modifications of construction, the feet of the bows being turned inward rather than outward, as in the preceding figures. Fig. 8 is a front elevation showing the invention in connection with the nose-pieces and spring of an eyeglass. Fig. 9 is a detail enlarged elevation showing the invention applied in connection with the nose-piece and spring and the preferred form of bow. Fig. 10 is a section of the same, taken on line $x$. Fig. 11 is a perspective of a blank from which the bow is formed when serving as a supporting-post for the nose-piece and spring of an eyeglass or as the temple-support of a spectacle. Fig. 12 is a perspective of said bow when formed from said blank. Fig. 13 is a plan of a blank for a clamping-plate for the nose-piece and spring of an eyeglass. Fig. 14 is an edge view of the same. Fig. 15 is an elevation of an eyeglass, showing another form of bow for spanning the opening in the eye-wire and also showing a new steady-post and its relation to the nose-piece. Fig. 16 is a detail perspective view showing a preferred construction in the method of attaching the temples to the bows. Figs. 17 and 18 show the eye-wire open at the catch and handle, respectively, the said catch and handle being spring-bows connecting the ends of the eye-wires; and Fig. 19 is a detail of the steady-post and nose-piece held thereby.

In said drawings, *a a* indicate the eye-wires, forming receptacles for the lenses $b$ $b$ and having attached thereto the nose-piece $c$ and temples or ear-wires $d$ $d$ of any suitable construction. The said receptacles are preferably of the usual oval or oblong shape, and at their ends the eye-wires are cut or open, as at $e$, to enable said receptacles to be enlarged or expanded, so that the lenses may be sprung into place and pressed out of the said receptacles without the trouble, skill, and carefulness in adjusting involved in cases where the ends of the eye-wires are screwed together.

To the eye-wire $a$, cut or open, as described, is fixed, preferably by solder, the feet $f'$ of the bow or spring attachment $f$, said feet preferably being bent oppositely and outwardly, as indicated in Figs. 1, 3, 4, 5, 9, and 16, and thus covering a considerable extension of surface of the eye-wire and serving to reinforce and strengthen the same where strain is greatly brought to bear thereon. The parts are so disposed and related as that one of the feet $f'$ of each bow or attachment extends over and conceals the cut or opening $e$, so that the edge of the lens inclosed by the eye-wire having said cut cannot be seen therethrough and an appearance of continuity is given to the eye-wire, which conduces to a workmanlike and finished effect and stiffness of frame.

To conceal the joint in the manner desired, one of the feet $f'$ is secured to the eye-wire end $e'$ a little back from the extremity thereof, the said eye-wire end extending beyond said foot across the aperture between the limbs $f''$ of the bow to a point beneath the other foot $f'$, where its extremity is concealed and where it lies loose beneath said other foot and free to work longitudinally when the eye-wire receptacle is expanded by the insertion of the lens. Beneath the foot $f'$ last above referred to is secured, preferably by solder, the other end $e''$, Fig. 4, of the eye-wire.

The feet are grooved or concaved longitudinally on the inner sides or made to receive and conform to the eye-wire. Lying in said groove, the loose end $e'$ is prevented from working laterally independent of the opposite end, as will be apparent.

The limbs $f''$ are more or less elastic and admit of the ends $e'$ $e''$ attached thereto spreading apart. At their outer ends said limbs are preferably integrally connected, the integral end connection $f'''$ serving as a keeper for holding said limbs in pivotal connection with the hinged end of the temple when employed therewith and from spreading apart under other conditions hereinafter referred to. The limbs, however, under certain conditions may be separate pieces, as indicated in Fig. 7, and serve a useful purpose, but, as indicated, I prefer a construction in which the outwardly-extending end of the limbs are integral one with the other by direct connection. At their outward ends said limbs are perforated, as shown in Fig. 3, and thus form bearings for hinge-pins $g$, Figs. 4 and 16, on which the temples turn pivotally.

Where I prefer to employ the bow in connection with the nose-wire $c$ or spring $c'$, I use the construction shown in Figs. 9 and 10. Here the bow at its outwardly-extending connected extremity $f'''$ provides a seat for the nose-piece or spring, on which said spring is held by a clamp $h$, the arms $h'$ of which are bent over the edges of the spring and around said seat, as shown in Fig. 10, and thus fasten said parts together, or in the case of the nose-piece of spectacles by solder. Another feature of novelty of the invention to which I desire to lay claim is shown in Figs. 15 and 19.

Among other varieties of construction it has been common to provide the eye-wires with curved steady-posts $p$ for the nose-pieces, which are fastened to the eye-wires by solder or other suitable means. To these, on the convex outer sides, have been fastened, by means of screws, the lower ends of the nose-piece $n$ of eyeglasses. In the present improved construction, preferred, the steady-posts are provided with lateral clamping-fingers $p'$, (shown clearly in Fig. 19,) which are bent around the ends of said nose-pieces, (outlined in Fig. 19,) the said nose-piece ends lying on the concave inner sides and being preferably recessed at the sides to receive said fingers and prevent slipping. By this arrangement the exposed convex parts of the nose-pieces, provided with cork or other material to provide a suitable bearing substance for the nose, are made to closely coincide in outline with the convex face of the steady-post, so that unsightly shoulders are avoided and a more neat construction is gained, and by dispensing with screws I obtain greater security and cheapness and avoid certain objections incident to the use of screws, such as the rough projecting screw-heads on the convex side, tending to scratch the skin as the eyeglass is being placed on the nose.

I may provide the bows serving to connect the eye-wire ends each with a single foot, as in Fig. 5, the one foot serving to cap or cover the opening $e$.

The bows, by which the elastic eye-wires or lens-receptacles are secured, may also be applied at the catches of eyeglasses where the two lenses are held together side by side when not in service. Such constructions are indicated in Figs. 17 and 18, where $s$ $t$ indicate the catches employed with the bows.

Having thus described the invention, what I claim as new is—

1. The combination with the cut or open eye-wire of an eyeglass or spectacles, of a bow, the feet of which are fastened on opposite sides of the cut or opening in said eye-wire, one of said feet being concavous and being fixed to one of the ends of the eye-wire and loosely covering and concealing the end to which the other foot is fixed, substantially as set forth.

2. In eyeglasses or spectacles, the combinations with the cut or open eye-wire and nose-piece, of connected limbs one of which has a foot fastened upon said eye-wire, covering the opening therein, the limb connection serving as a seat for the nose-piece $c$, and said nose-piece, seated on said connection, substantially as set forth.

3. In eyeglasses or spectacles, the combination with the cut or open eye-wire and nose-piece, of connected limbs, having concaved or grooved feet, one of which covers the opening in the eye-wire and is attached to the eye-wire end opposite that to which the other foot is attached, the connection of said limbs providing bearings for attachments of said eye-wire, such as the nose-pieces or temples, substantially as set forth.

4. The combination with the open eye-wire, of integrally-connected limbs having longitudinally concaved or grooved oppositely-extending feet fastened on opposite sides of the opening in said eye-wire, one of which feet covers the opening and prevents lateral movement of the eye-wire end lying loose therein, said limbs being perforated at their outer extensions, and temples hinged in said perforations, substantially as set forth.

5. In eyeglasses or spectacles, the combinations with the eye-wire and curved steady-post $p$, having lateral fingers formed at opposite sides and bent toward one another in a plane substantially parallel with the concaved face of said post, and a nose-piece arranged at one end at the concave side of the steady-post and grasped and held in engagement by said fingers, the convex outline of the steady-post and the convex part of the nose-piece being substantially coincident in curved alinement, substantially as set forth.

In testimony that I claim the foregoing I have hereunto set my hand this 9th day of July, 1895.

GEO. W. MEIGS.

Witnesses:
CHARLES H. PELL,
BEATRICE CHARLES.